US010966260B2

(12) United States Patent
Liang et al.

(10) Patent No.: US 10,966,260 B2
(45) Date of Patent: Mar. 30, 2021

(54) DEVICE, SYSTEM AND METHOD FOR VOLTE SETUP

(71) Applicant: APPLE INC., Cupertino, CA (US)

(72) Inventors: Huarui Liang, Beijing (CN); Dawei Zhang, Saratoga, CA (US); Shangfeng Li, Beijing (CN); Hao Sun, Beijing (CN); Zhiwei Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 15/755,360

(22) PCT Filed: Aug. 28, 2015

(86) PCT No.: PCT/CN2015/088362
§ 371 (c)(1),
(2) Date: Feb. 26, 2018

(87) PCT Pub. No.: WO2017/035691
PCT Pub. Date: Mar. 9, 2017

(65) Prior Publication Data
US 2018/0255594 A1    Sep. 6, 2018

(51) Int. Cl.
*H04W 76/12* (2018.01)
*H04W 76/10* (2018.01)
*H04L 29/06* (2006.01)
*H04W 76/27* (2018.01)
*H04L 12/66* (2006.01)

(52) U.S. Cl.
CPC ......... *H04W 76/12* (2018.02); *H04L 65/1006* (2013.01); *H04L 65/1016* (2013.01); *H04L 65/1069* (2013.01); *H04L 65/1073* (2013.01); *H04L 65/80* (2013.01); *H04W 76/10* (2018.02); *H04W 76/27* (2018.02); *H04L 12/66* (2013.01)

(58) Field of Classification Search
CPC . H04L 41/0668; H04L 43/0805; H04L 12/24; H04L 29/06217; H04L 65/1073; H04W 24/04; H04W 36/0022
See application file for complete search history.

(56) References Cited

U.S. PATENT DOCUMENTS 9,191,265 B1 * 11/2015 McGinn ............ H04L 29/06217
2014/0064070 A1    3/2014 Paladugu et al.
(Continued)

FOREIGN PATENT DOCUMENTS

CN       104685921       6/2015
WO       2015/016546     2/2015

*Primary Examiner* — Iqbal Zaidi
(74) *Attorney, Agent, or Firm* — Fay Kaplun & Marcin, LLP

(57) ABSTRACT

A device, system, and method performs a Voice over Long Term Evolution (LTE) (VoLTE) call setup procedure. The device includes a transceiver establishing a connection with a LTE network and an Internet Protocol (IP) Multimedia Subsystem (IMS). The device includes a processor executing a VoLTE call application with a further user equipment, receiving an input to execute the VoLTE call application, and generating a data packet including an indication to trigger a dedicated bearer establishment procedure. The transceiver transmits the data packet to one of the LTE network and the IMS. The indication triggers the dedicated bearer establishment procedure to be performed during a Session Initiation Protocol (SIP) signal exchange procedure.

20 Claims, 8 Drawing Sheets

(56) References Cited

U.S. PATENT DOCUMENTS

2016/0142931 A1\* 5/2016 Mondal ................ H04L 67/141
370/252
2016/0174188 A1\* 6/2016 Kim ..................... H04W 68/02
455/458

\* cited by examiner

DEVICE, SYSTEM AND METHOD FOR VOLTE SETUP

BACKGROUND INFORMATION

A first station may be configured to communicate wirelessly with a second station. Specifically, the first station may transmit data to and receive data from the second station through a wired or wireless communications network. The first and second stations may use the network to communicate using a variety of different applications. For example, the first station may be a mobile originating (MO) user equipment (UE) while the second station may be a mobile terminating (MT) UE for a voice call. The voice call may be performed in a variety of different manners. For example, when the MO or MT UE is connected to a legacy network, the voice call may be performed using circuit switching. In another example, when the MO or MT UE is connected to an Internet Protocol (IP) data transmission network, the voice call may be performed using Voice over IP (VoIP). More specifically, when the network is a Long Term Evolution (LTE) network, the VoIP call may be a Voice over LTE (VoLTE) call.

When the VoLTE call is performed, the MO and MT UEs may perform a setup procedure. Initially, when the MO and MT UEs connect to the LTE network, each UE may be associated with one or more default bearers that provide a best effort service in the exchange of data with the LTE network. Furthermore, when a particular application is being utilized such as the VoLTE call, each UE may be associated with a dedicated bearer that provides a dedicated tunnel for data to be transmitted with regard to the VoLTE call (e.g., the voice data). The dedicated bearer may provide a variety of functionalities such as improving throughput or guaranteeing a bit rate for the data to be transmitted. The setup procedure utilizes various operations that are performed. However, due to an ordering of the operations, a timing of the operations, an execution of the operations, etc., a user experience may be negatively impacted such as delays being introduced.

SUMMARY

A first exemplary embodiment is directed to a user equipment comprising: a transceiver configured to establish a connection with a Long Term Evolution (LTE) Network and an Internet Protocol (IP) Multimedia Subsystem (IMS); and a processor configured to execute a Voice over LTE (VoLTE) call application with a further user equipment, the processor configured to receive an input to execute the VoLTE call application, the processor configured to generate a data packet including an indication to trigger a dedicated bearer establishment procedure, wherein the transceiver is configured to transmit the data packet to one of the LTE network and the IMS, wherein the indication triggers the dedicated bearer establishment procedure to be performed during a Session Initiation Protocol (SIP) signal exchange procedure.

Another exemplary embodiment is directed to A method comprising at a UE configured to perform a VoLTE call with a further UE, the UE connected to a LTE network and an IMS: receiving an input to execute a VoLTE call application; generating a data packet including an indication to trigger a dedicated bearer establishment procedure; and transmitting the data packet to one of the LTE network and the IMS, wherein the indication triggers the dedicated bearer establishment procedure to be performed during a SIP signal exchange procedure.

A further exemplary embodiment is directed to a network component of an IMS, the network component comprising a transceiver configured to establish a connection with a LTE Network and first and second user equipments configured to perform a VoLTE call; and a processor configured to receive a SIP invite from the first user equipment to perform the VoLTE call with the second user equipment, the processor configured to generate a data packet to trigger a dedicated bearer establishment procedure, the processor configured to perform a forwarding operation to transmit the SIP invite to the second user equipment and to transmit the data packet to a gateway of the IMS, wherein the data packet enables the dedicated bearer to be established during further SIP signal exchanges.

A yet further exemplary embodiment is directed to a method comprising: at a network component of an IMS, establishing a connection with a LTE Network and first and second user equipments configured to perform a VoLTE call; receiving a SIP invite from the first user equipment to perform the VoLTE call with the second user equipment; generating a data packet to trigger a dedicated bearer establishment procedure; and performing a forwarding operation to transmit the SIP invite to the second user equipment and to transmit the data packet to a gateway of the IMS, wherein the data packet enables the dedicated bearer to be established during further SIP signal exchanges.

DETAILED DESCRIPTION

Figure 1:
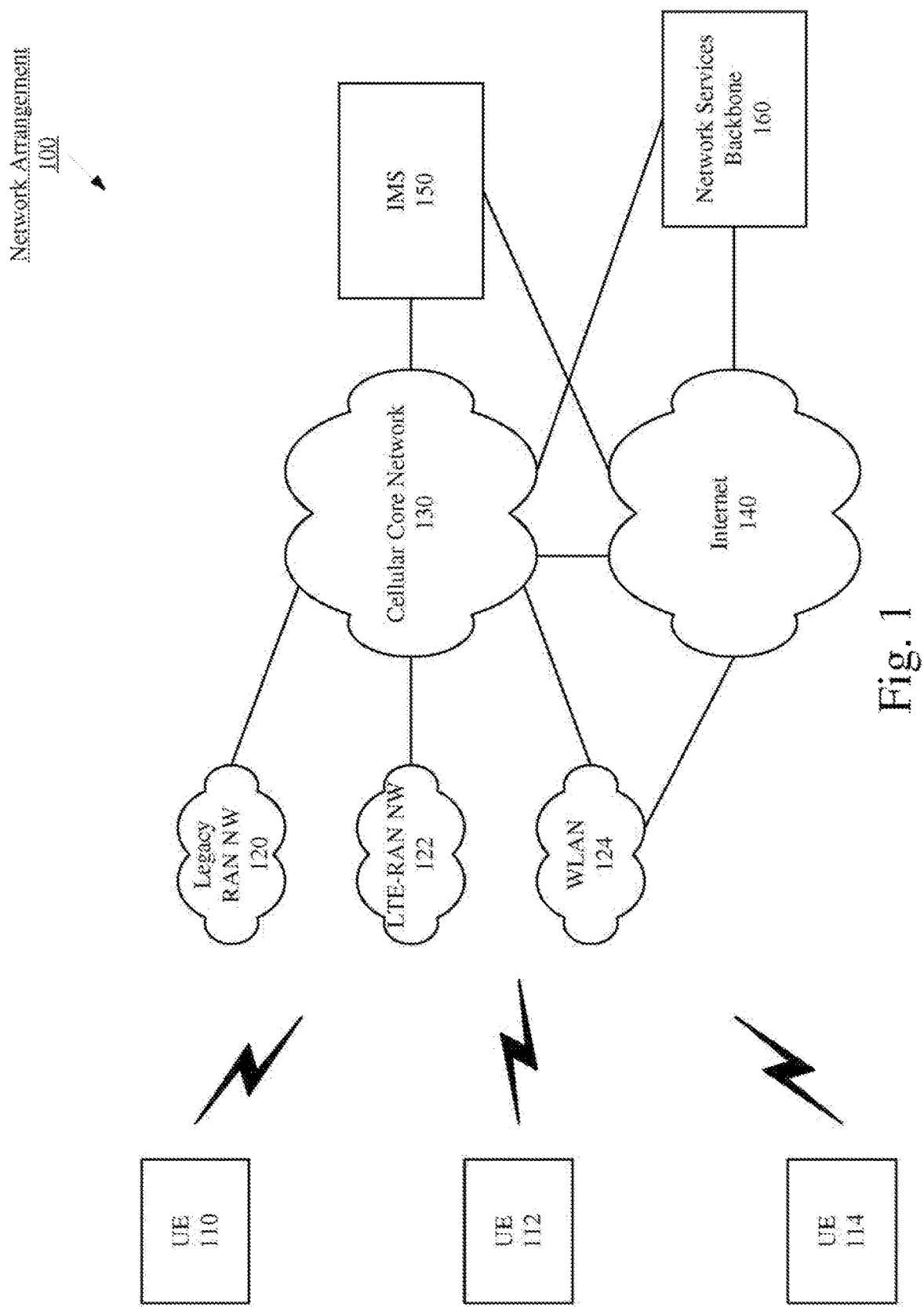
FIG. 1 shows an exemplary network arrangement, according to some embodiments.

The exemplary embodiments may be further understood with reference to the following description and the related appended drawings, wherein like elements are provided with the same reference numerals. The exemplary embodiments are related to a device, system, and method for establishing a dedicated bearer for a Voice over Long Term Evolution (LTE) (VoLTE) call. Specifically, the exemplary embodiments provide a mechanism by which the dedicated bearer may be established or prepared to be established to remove a delay when performing a setup procedure for the VoLTE call. In a first exemplary embodiment, a mobile originating (MO) user equipment (UE) may perform an operation to prepare the dedicated bearer to be established. In a second exemplary embodiment, a network component may perform an operation to establish the dedicated bearer based upon an early trigger.

Initially, it is noted that the exemplary embodiments are described with regard to a VoLTE call. However, the VoLTE call is only exemplary. In some exemplary embodiments, the VoLTE may be a component of the communication performed by the MO UE. For example, the VoLTE may be a component of a video over LTE functionality. Thus, any use of a VoLTE call or a voice call may be representative of other communication calls including a video call.

FIG. 1 shows an exemplary network arrangement 100, according to some embodiments. The exemplary network arrangement 100 includes UEs 110-114. In this example, it is assumed that a respective, different user is using each of the UEs 100-114. For example, a first user may be utilizing the UE 110, a second user may be utilizing the UE 112, and a third user may be utilizing the UE 114. Those skilled in the art will understand that the UEs 110-114 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes. However, as will be understood from the description herein, the exemplary embodiments may relate to when at least two UEs 110-114 are present in the network arrangement 100.

Each of the UEs 110-114 may be configured to communicate with one or more networks. In this example, the networks with which the UEs 110-114 may communicate are a legacy radio access network (RAN) 120, a LTE RAN (LTE-RAN) 122, and a wireless local area network (WLAN) 124. In this example, each of the networks 120-124 is a wireless network with which the UEs 110-114 may communicate wirelessly. However, it should be understood that the UEs 110-114 may also communicate with other types of networks using a wired connection. With regards to the exemplary embodiments, the UEs 110-114 may establish a connection with the LTE-RAN 122 to perform VoLTE calls with other UEs. For example, the UEs 110-114 may have a LTE chipset to communicate with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the UEs 110-114 to communicate with the WLAN 124. However, as noted above, the exemplary embodiments relate to the UEs 110-114 utilizing the LTE-RAN 122 to perform VoLTE calls.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. Thus, when the corresponding UE of the user registers with the IMS 150 (e.g., connects thereto), the subscription information may be utilized to determine various features. For example, this subscription information is used to provide the correct multimedia services to the user such as a VoLTE call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the UEs 110-114, etc.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 performing a VoLTE call. For example, the UE 110 may be the MO UE that invites a further UE such as the UE 112, which may be a mobile terminating (MT) UE. Initially, the UEs 110-114 establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific base station (e.g., an eNB of the LTE-RAN 122).

When the UEs 110-114 associate and establish a connection with the LTE-RAN 122, one or more default bearers may be established for the UE 110-114. Initially, a bearer may define how data is treated when transmitted through the network. That is, the bearer may be a set of network parameters that define data specific treatment by type or association with an application. Accordingly, the LTE-RAN 122 may treat a first type of data in a first way and treat a second type of data in a second way. For example, the first type of data may be prioritized so that the LTE-RAN 122 treats this data in a special manner. It should be noted that the bearer may also define the treatment based upon user identity or other identification parameters.

One type of bearer that is established when initially connecting to the LTE-RAN 122 is a default bearer. The LTE-RAN 122 via the associated eNB may assign the default bearer, which remains so long as the UE is connected to the LTE-RAN 122. The default bearer may be a best effort service for the data transmitted through the LTE-RAN 122. Thus, depending upon various network conditions currently being experienced by the LTE-RAN 122, the data being transmitted through the default bearer may be given whatever resources are available. The default bearer may be associated with a particular IP address and a single UE may have further default bearers established. Each default bearer may be assigned a quality of service (QoS) class indicator (QCI) of 5 to 9 that relates to non-guaranteed bit rate (GBR) bearers. Applications that may utilize the default bearer may be those in which the delivery of data is less time sensitive. For example, signaling messages such as Session Initiation Protocol (SIP) may utilize the default bearer. Other examples include smartphone traffic including video, chat, email, browsing, etc.

A further type of bearer that may be established between the UE and the LTE-RAN 122 is a dedicated bearer. The dedicated bearer may provide a dedicated tunnel to specific traffic. One application that utilizes the dedicated tunnel is VoLTE voice data used when performing the VoLTE call. The dedicated bearer may be an additional bearer over the default bearer that is established at a time subsequent to the default bearer being established (e.g., upon performing the VoLTE call). Since only default bearers require separate IP addresses and the dedicated bearer is provided over an established default bearer, the dedicated bearer does not require a separate IP address. However, the dedicated bearer is linked to the default bearer established previously. Specifically, a value defined during setup of the dedicated bearer may be used to link the dedicated bearer to the default bearer. The dedicated bearer may utilize the same QCI as the default bearer but may also utilize a different QCI that relates to a GBR bearer. The dedicated bearer may use traffic flow templates (TFT) to provide the special treatment to specific services such as the VoLTE call. That is, the TFT may also define the rules of when the dedicated bearer is to be used based upon the application being executed.

When considering the operation of the default bearer and the dedicated bearer, the default bearer is established upon the UE connecting to the LTE-RAN 122. Specifically, the LTE-RAN 122 assigns the default bearer to the UE. Subsequently, while still connected to the LTE-RAN 122, the UE may execute the VoLTE call functionality. For example, the UE 110 may be the MO UE while the UE 112 may be the MT UE. As such, the MT UE may also be connected to the LTE-RAN 122 and have a default bearer assigned and established. When the VoLTE call functionality is performed, various signaling messages are transmitted between the UE 110 and the UE 112 via the LTE-RAN 122 and the IMS 150 through the respective default bearer. That is, a VoLTE call setup procedure may be performed. Once the VoLTE call has been established from successfully transmitting the different signaling messages, the UE 110 and the UE 112 may be connected to each other to perform the VoLTE call. Specifically, the dedicated bearer may be established for each of the UE 110 and the UE 112 for the VoLTE data to be transmitted.

The VoLTE call setup procedure may initially include the UE 110 establishing a connection to the IMS 150. It should be noted that this operation of the setup procedure may be a more general operation that is performed at various other times and not necessarily be performed due to the VoLTE call being performed. For example, the connection to the IMS 150 may occur whenever the UE 110 has established a connection to the LTE-RAN 122. However, it is also noted that in order to utilize the VoLTE call functionality, a connection to the IMS 150 may be required.

The connection to the IMS 150 may be performed through an initial association with the eNB of the LTE-RAN 122. A subsequent connection may be established to the IMS 150 through various components of the IMS 150. Specifically, an attach procedure may be performed in connecting the UE 110 to the IMS 150. For example, the IMS 150 may include a mobility management entity (MME) and a packet data network (PDN) gateway (PGW). These components may be responsible for at least one operation when the VoLTE call functionality is used. Specifically, the MME may be a control-node for the LTE-RAN 122 that performs paging and tagging operations for an idle mode of the UE 110. More specifically, the MME may perform operations related to bearer activation and/or deactivation. The MME may also select a serving gateway (SGW) at the initial attach with the IMS 150. The SGW may be configured to route and forward data packets for the UE 110. For example, the SGW may manage and store contexts for the UE 110 such as parameters of the bearer service, network internal routing information, etc. The MME may also authenticate the UE 110 (via the HSS) such that the services available to the UE 110 are identified including the VoLTE call functionality. The PGW may be configured to provide a connectivity between the UE 110 to an external PDN by being a point of entry/exit for data packet traffic for the UE 110. It is noted that the IMS 150 may provide a connection to a plurality of PGW to access a corresponding number of PDN. Thus, the UE 110 may be enabled to exchange data packets with multiple PDNs via the PGW of the IMS 150. During the attach procedure, the UE 110 may attach when a default access point name (APN) is an IMS APN and the IMS PDN is established during the default bearer determination. However, if the default APN is not the IMS APN, the IMD PDN may be established following the attach procedure.

Once the attach procedure is performed and the UE 110 has established a connection to the IMS 150, an IMS registration procedure may be performed. The IMS registration procedure may enable the identified multimedia services to be accessed. Specifically, the IMS registration procedure may entail registering at least one IP Multimedia Public Identity (IMPU) such as a telephone number of the UE 110. The IMS 150 may then authenticate an IP Multimedia Private Identity (IMPI). The registration process may be initiated by the UE 110 transmitting a SIP registration message to a proxy call session control function (CSCF) (P-CSCF). Using further message passing operations such as through an interrogating CSCF (I-CSCF) and a serving CSCF (S-CSCF), an authentication procedure may be performed via the HSS. With specific regard to the VoLTE call functionality, the IMS registration procedure may incorporate the P-CSCF and a policy and charging rules function (PCRF). The P-CSCF may be a SIP proxy providing a first point of contact for the UE 110 with the IMS 150. The P-CSCF may also be disposed on a path of all signaling to inspect each signal ensuring that the UE 110 does not misbehave such as changing a known signaling route or disobeying a routing policy. The PCRF may determine policy rules in the IMS 150. The PCRF aggregates information to and from the IMS 150 to support creation of the rules and make policy decisions for the multimedia services performed by the UE 110. With particular regard to the VoLTE call functionality, the PCRF may be a mediator of network resources for the IMS 150 to establish the call and allocate the requested bandwidth to the dedicated bearer.

With the UE 110 having been attached to and registered with the IMS 150, the user of the UE 110 may opt to perform the VoLTE call functionality. Thus, the VoLTE call setup procedure may receive the input from the user in performing this operation. For example, the user may launch a VoLTE call application and provide/select an identity of the MT UE 112. To perform the VoLTE call, the UE 110 may transmit a SIP invite to the UE 112 via the P-CSCF. Specifically, the SIP invite may be transmitted to the P-CSCF which is forwarded to the UE 112. The UE 112 may respond with a SIP: 100 trying signal back to the P-CSCF (e.g., an extended search requiring a significant amount of time triggers a forking proxy to send the 100 trying response) which is then forwarded back to the UE 110. The UE 112 may also respond with a SIP: 183 session progress signal back to the P-CSCF (e.g., extra information for the VoLTE call while still in setup) which is then also forwarded back to the UE 110.

Once the IMS 150 has determined that the VoLTE call is to be performed via the SIP signaling exchange, the P-CSCF may perform the operation to trigger the dedicated bearer for the VoLTE call. Specifically, a corresponding signal may be forwarded from the P-CSCF to the PCRF. The PCRF may also trigger the dedicated bearer for the VoLTE call. Specifically, a further corresponding signal may be forwarded from the PCRF to the PGW. Subsequently, the dedicated bearer may be established for the UE 110. A further operation that may be performed is the QCI being set to 1 for the VoLTE call that is signaled from the MME to the eNB. With the dedicated bearer created and established, the VoLTE call may be performed by the UE 110.

Those skilled in the art will understand that the conventional VoLTE call setup procedure utilizes the PGW to trigger the dedicated bearer established upon the P-CSCF initiating the triggering of the dedicated bearer for the VoLTE call and the PCRF confirming that there are sufficient resources for the dedicated bearer establishment. However, this portion of the VoLTE call setup procedure causes at least a 1 second delay that impacts the user experience in the setup.

Some aspects of the exemplary embodiments provide a mechanism by which the delay may be reduced and/or eliminated. That is, the mechanism according to the exemplary embodiments introduces a solution to save VoLTE call setup time. Specifically, the triggering of the dedicated bearer establishment may be performed using various different operations at a time prior to the conventional operation. As will be described in further detail below, the operations may be performed by the MO UE 110 and/or the IMS 150. In a first set of mechanisms performed by the UE 110, a first proposed mechanism may be updating a current radio resource control (RRC) procedure that uses a new cause identification; a second proposed mechanism may be updating a non-access-stratum (NAS) that uses the UE 110 requesting a dedicated bearer resource allocation procedure; and a third proposed mechanism may be updating the NAS with a new cause identification. In a second mechanism performed by the IMS 150, a fourth proposed mechanism introduces a new policy and charging control (PCC) procedure.

Figure 2:
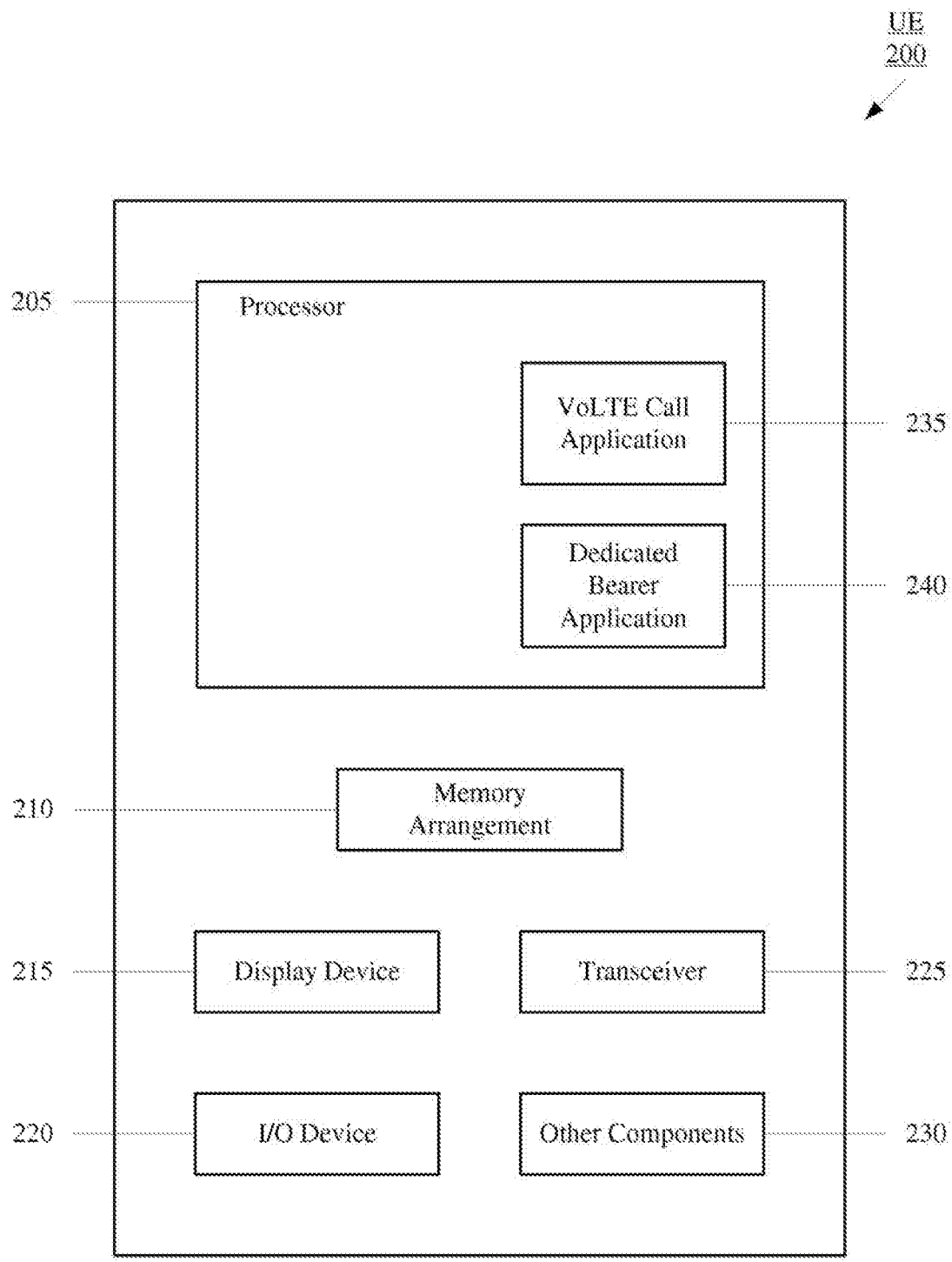
FIG. 2 shows an exemplary user equipment configured to establish a dedicated bearer, according to some embodiments.

In the first set of mechanisms performed by the UE 110, FIG. 2 shows an exemplary UE 200 configured with dedicated bearer functionalities, according to some embodiments. Specifically, the UE 200 is configured to execute a plurality of applications that perform the respective functionalities of establishing the dedicated bearer for the VoLTE call according to the exemplary embodiments. Accordingly, the UE 200 of FIG. 2 may correspond to the MO UE 110. However, those skilled in the art will understand that the UE 200 may also represent the other UEs 112, 114. However, it should be noted that the other UEs 112, 114 may not necessarily be capable of performing the functionalities described below with regard to the UE 110.

The UE 200 may represent any electronic device that is configured to perform wireless functionalities and may be representative of one or more of the UEs 110-114. For example, the UE 200 may be a portable device such as a smartphone, a tablet, a phablet, a laptop, a wearable, etc. In another example, the UE 200 may be a client stationary device such as a desktop terminal. The UE 200 may be configured to perform cellular and/or WiFi functionalities. The UE 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 200 to other electronic devices, etc.

The processor 205 may be configured to execute a plurality of applications of the UE 200. For example, the applications may include a web browser when connected to a communication network via the transceiver 225. As such, when connected to the LTE-RAN 122, the data for the web browser may utilize the default bearer. In another example, the processor 205 may execute a VoLTE call application 235 that enables the UE 200 to perform a VoLTE call functionality such as with the UE 112. The VoLTE call application 235 may further be configured to perform the VoLTE call setup procedure such as performing the steps described above. In yet another example, the processor 205 may execute a dedicated bearer application 240. As will be described in further detail below, the dedicated bearer application 240 may perform the above noted mechanism of triggering the establishment of the dedicated bearer for use in the VoLTE call. That is, the dedicated bearer application 240 may be used in conjunction with the VoLTE call application 235, particularly in the VoLTE call setup procedure.

It should be noted that the above noted applications each being an application (e.g., a program) executed by the processor 205 is only exemplary. The functionality associated with the applications may also be represented as a separate incorporated component of the UE 200 or may be a modular component coupled to the UE 200, e.g., an integrated circuit with or without firmware. In addition, in some UEs, the functionality described for the processor 205 is split among two processors, a baseband processor and an applications processor. The exemplary embodiments may be implemented in any of these or other configurations of a UE.

The memory 210 may be a hardware component configured to store data related to operations performed by the UE 200. Specifically, the memory 210 may store data related to the various applications 235-240. For example, the VoLTE call application 235 may utilize a phone book functionality that stores contact information for other users and UEs. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to the VoLTE call functionality. Thus, an antenna (not shown) coupled with the transceiver 225 may enable the transceiver 225 to operate on the LTE frequency band.

Figure 3:
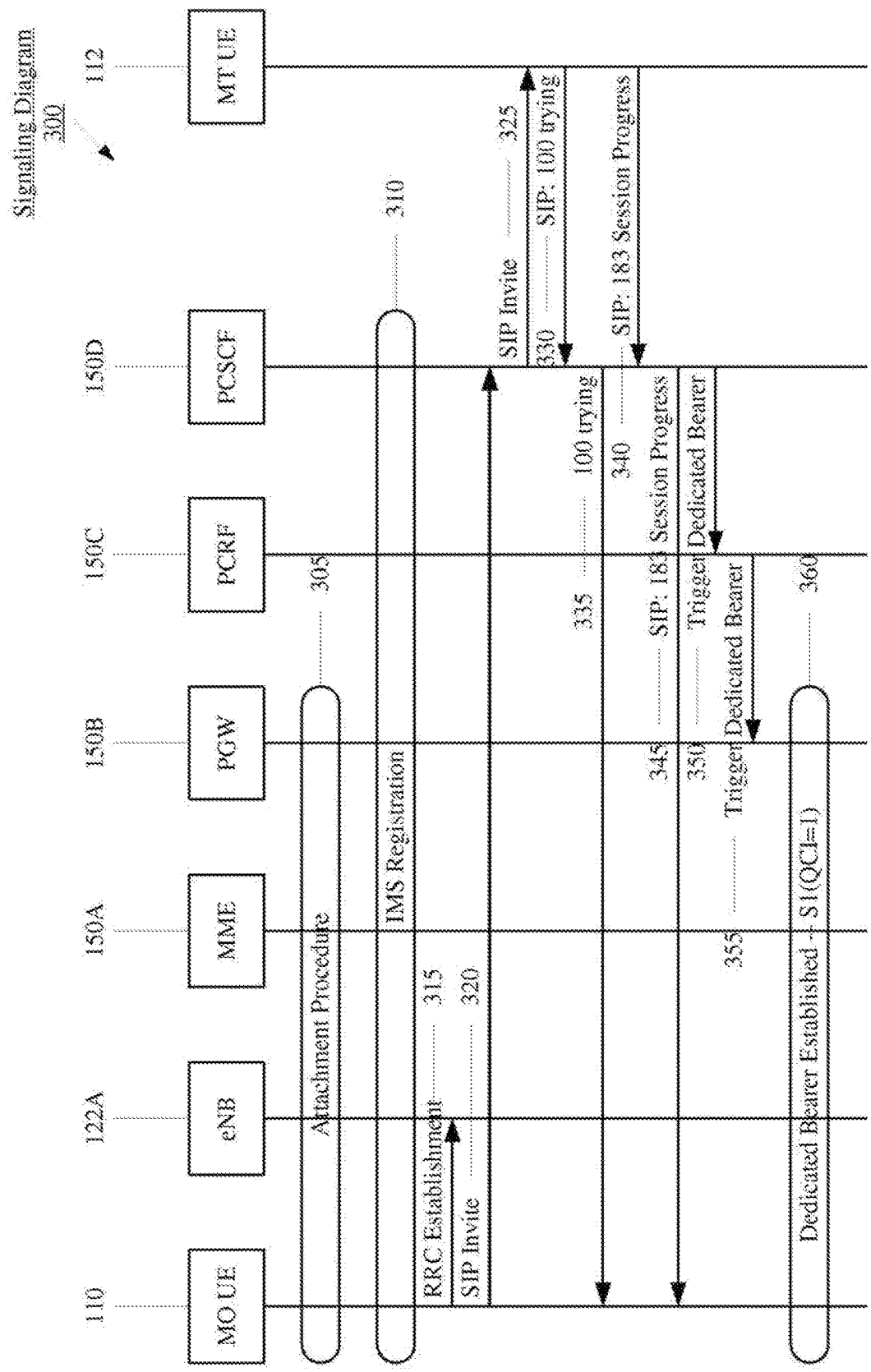
FIG. 3 shows a first exemplary signaling diagram for establishing a dedicated bearer through a user equipment operation, according to some embodiments.

FIG. 3 shows a first exemplary signaling diagram 300 for establishing a dedicated bearer through a UE operation, according to some embodiments. As described above, the exemplary embodiments include a first set of mechanisms by which the MO UE 110 performs an operation to trigger the dedicated bearer in being established for the VoLTE call. The signaling diagram 300 relates to when the UE 110 executes the VoLTE call application 235 and the dedicated bearer application 240 in performing the VoLTE call setup procedure. Specifically, the signaling diagram 300 relates to the operation performed on the UE 110 such that the dedicated bearer is established in such a way that the delay caused from the signaling between the P-CSCF and the PCRF after the SIP signaling is reduced and/or eliminated. It may be assumed that the other MT UE 112 is also capable of performing the VoLTE call and properly performs all necessary operations in establishing the VoLTE call.

The signaling diagram 300 illustrates a VoLTE call setup procedure. The signaling diagram 300 includes substantially similar operations as described above. Initially, the MO UE 110 may establish a connection with an eNB 122A of the LTE-RAN 122 as well as the IMS 150 using an attachment procedure 305. Specifically, the UE 110 may detect the presence of the LTE-RAN 122 and transmit a connection request to the eNB 122A. Upon performing an association procedure, the UE 110 may establish a connection to the LTE-RAN 122 via the eNB 122A. Furthermore, upon establishing the connection the LTE-RAN 122, the eNB 122A may assign a default bearer for the UE 110 and establish the default bearer. The attachment procedure 305 may therefore also be utilized with components of the IMS 150 such as a MME 150A and a PGW 150B. The attachment procedure 305 may be substantially identical to the attachment procedure described above. The MO UE 110 may also perform an IMS registration 310 upon connecting to the IMS 150. The IMS registration 310 may therefore further be utilized with components of the IMS 150 such as a PCRF 150C and a P-CSCF 150D. It should be noted that the MT UE 112 may perform substantially similar operations (not shown) to connect to the LTE-RAN 122 and the IMS 150.

With the UE 110 connected to the LTE-RAN 122 and the IMS 150 and the IMS registration procedure completed to indicate that the UE 110 is configured to perform the VoLTE call functionality, the UE 110 may execute the VoLTE call application 235. The initiation of the VoLTE call application 235 may be used to initiate the operations performed by the dedicated bearer application 240. Specifically, according to the first exemplary mechanism, the RRC establishment 315 may be performed. Although the conventional operations of the RRC establishment may also be performed, the exemplary embodiments further utilize a new cause identification. Specifically, the RRC establishment 315 includes a new RRC establishment cause to the LTE-RAN 122 via a signaling to the eNB 122A. When the RRC establishment is due to the MO UE 110 performing a voice call, the MO UE 110 may signal a VoLTE cause identification to indicate to the LTE-RAN 122 to reserve a QCI1 (i.e., a QCI with value of 1) resource and trigger a dedicated bearer establishment after the RRC establishment 315. It is noted that a video call may reserve the QCI1 as well as a QCI2. Thus, the triggering of the dedicated bearer establishment may now be an operation that is performed while the further signaling in the VoLTE call setup procedure is being performed. Therefore, in this mechanism, it may be considered that the dedicated bearer establishment and the VoLTE call setup procedure are performed in parallel. In this manner, the VoLTE call setup procedure is no longer required to wait until after the SIP 183 signaling to be completed in triggering the dedicated bearer.

After the RRC establishment procedure 315 has been completed, the remaining operations of the VoLTE call setup procedure may be performed in addition to the parallel execution of the triggering of the dedicated bearer. Thus, the SIP signaling may be performed in which the SIP invite 320 may be transmitted from the MO UE 110 to the P-CSCF 150D; the SIP invite 325 may be transmitted from the P-CSCF to the MT UE 112; the SIP: 100 trying 330 may be transmitted from the MT UE 112 to the P-CSCF 150D, the 100 trying signal 335 may be transmitted from the P-CSCF 150D to the MO UE 110; the SIP: 183 session progress 340 may be transmitted from the MT UE 112 to the P-CSCF 150D; and the SIP: 183 session progress 345 may be transmitted from the P-CSCF 150D to the MO UE 110. While this SIP signaling is being performed, the signal to trigger the dedicated bearer 350 may be transmitted from the P-CSCF 150D to the PCRF 150C; and the signal to trigger the dedicated bearer 355 may be transmitted from the PCF 150C to the PGW 150B. Accordingly, the dedicated bearer 360 is established and the VoLTE call may be performed.

It is noted that although the signaling diagram 300 appears to show such that the dedicated bearer is triggered after the SIP: 183 session progress signaling, it is noted that this is not representative of the operations of the exemplary embodiments. In contrast, the SIP signaling including the invite, the 100 trying, and the 183 session progress may be performing in the order shown, but the triggering of the dedicated bearer may be performed in parallel to these SIP signaling and is not performed after the SIP signaling.

Figure 4:
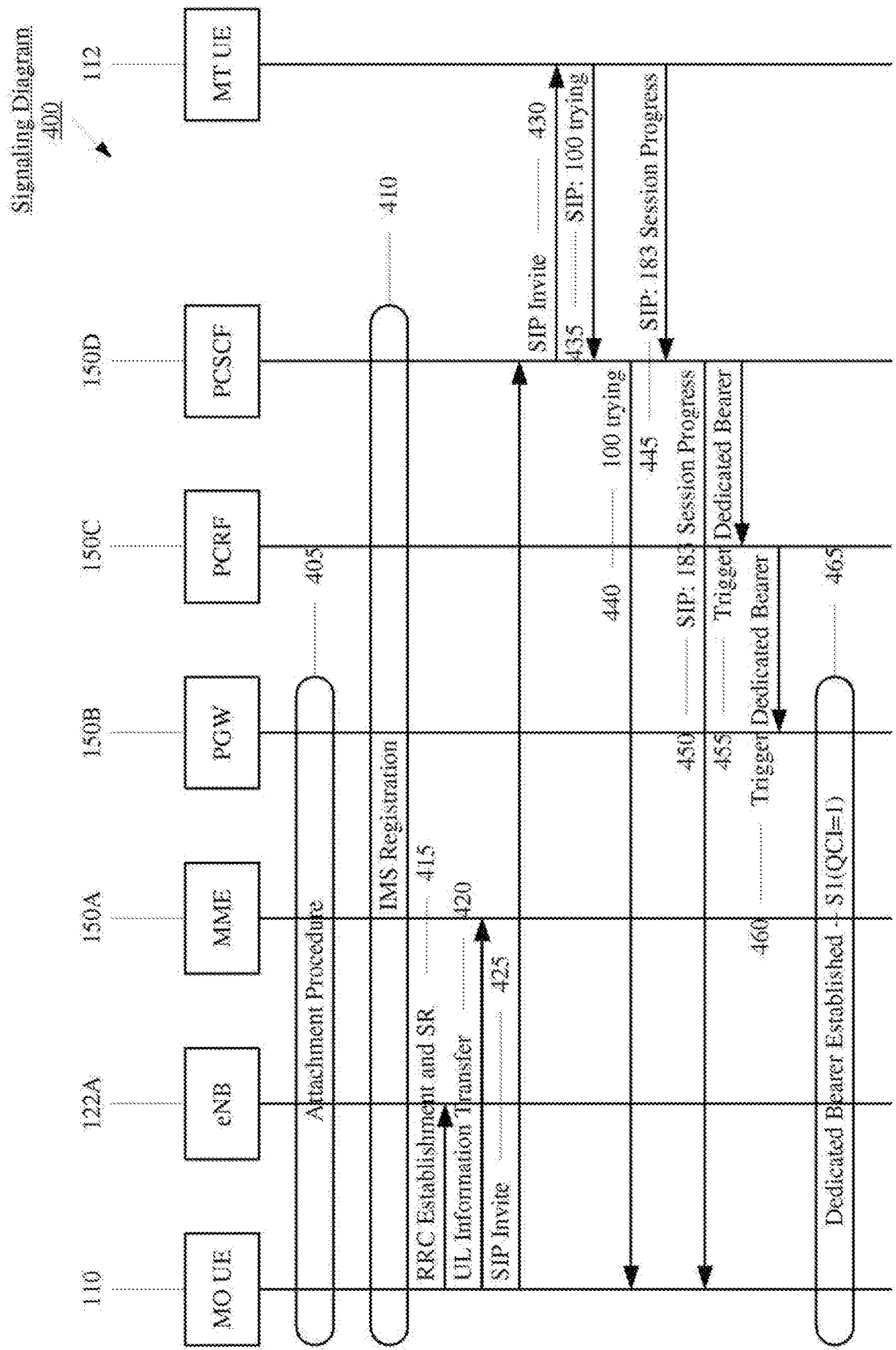
FIG. 4 shows a second exemplary signaling diagram for establishing a dedicated bearer through a user equipment operation, according to some embodiments.

FIG. 4 shows a second exemplary signaling diagram 400 for establishing a dedicated bearer through a UE operation, according to some embodiments. The signaling diagram 400 relates to when the UE 110 executes the VoLTE call application 235 and the dedicated bearer application 240 in performing the VoLTE call setup procedure. That is, the signaling diagram 400 also relates to the first set of mechanisms by which the MO UE 110 performs an operation to trigger the dedicated bearer in being established for the VoLTE call. The signaling diagram 400 relates to the operation performed on the UE 110 such that the dedicated bearer is established in such a way that the delay caused from the signaling between the P-CSCF 150D and the PCRF 150C after the SIP signaling is reduced and/or eliminated. It may be assumed that the other MT UE 112 is also capable of performing the VoLTE call and properly performs all necessary operations in establishing the VoLTE call.

The signaling diagram 400 illustrates a VoLTE call setup procedure. The signaling diagram 400 includes substantially similar operations as described above, particularly with regard to the signaling diagram 300 of FIG. 3. Thus, the MO UE 110 may perform an attachment procedure 405 and an IMS registration 410. With the UE 110 connected to the LTE-RAN 122 and the IMS 150 and the IMS registration procedure completed to indicate that the UE 110 is configured to perform the VoLTE call functionality, the UE 110 may execute the VoLTE call application 235. The initiation of the VoLTE call application 235 may again be used to initiate the operations performed by the dedicated bearer application 240. Specifically, according to the second exemplary mechanism, the RRC establishment and service request (SR) 415 and the uplink (UL) information transfer 420 may be performed. The RRC establishment and SR 415 may relate to a conventional procedure. Therefore, conventional operations may be performed in establishing the RRC and transmitting the appropriate SR to perform the VoLTE call such as when the MO UE 110 is in the RRC idle state. It is noted that the RRC establishment and SR 415 may not be performed. For example, the MO UE 112 may already be in a RRC connected state which may then only entail the MO UE 110 sending the UL information transfer 420. The UL information transfer 420 may be a follow-up procedure upon completing the RRC establishment and SR 415 or a parallel procedure along with the RRC establishment and SR 415. The UL information transfer 420 may be a signaling process from the MO UE 110 to the MME 150A. The UL information transfer 420 may be a dedicated bearer resource allocation request from the UE 110. Accordingly, the PGW 150B may trigger a QCI1 establishment from receiving the request to establish the QCI1 dedicated bearer for the VoLTE call. In this manner, the VoLTE call setup procedure is no longer required to wait until after the SIP 183 signaling to be completed in triggering the dedicated bearer.

In a particular exemplary embodiment, the Third Generation Partnership Project (3GPP) Technical Specification (TS) 24.301 defines a UE procedure. However, the resources are ultimately controlled by the LTE-RAN 122 and not substantially used as a UE-side operation. The second mechanism described above according to the exemplary embodiments utilize this procedure for QCI1 establishment while the VoLTE call is triggered. Accordingly, the UL information transfer 420 may be a message used for an UL transfer of NAS or non-3GPP dedicated information. Through adaptation of this message, the UL information transfer 420 may be utilized for the purposes described above.

After the UL information transfer 420 has been completed, the remaining operations of the VoLTE call setup procedure may be performed in addition to the parallel execution of the triggering of the dedicated bearer. Thus, the SIP signaling may be performed in which the SIP invite 425 may be transmitted from the MO UE 110 to the P-CSCF 150D; the SIP invite 430 may be transmitted from the P-CSCF to the MT UE 112; the SIP: 100 trying 435 may be transmitted from the MT UE 112 to the P-CSCF 150D, the 100 trying signal 335 may be transmitted from the P-CSCF 150D to the MO UE 110; the SIP: 183 session progress 445 may be transmitted from the MT UE 112 to the P-CSCF 150D; and the SIP: 183 session progress 450 may be transmitted from the P-CSCF 150D to the MO UE 110. While this SIP signaling is being performed, the signal to trigger the dedicated bearer 455 may be transmitted from the P-CSCF 150D to the PCRF 150C; and the signal to trigger the dedicated bearer 460 may be transmitted from the PCF 150C to the PGW 150B. Accordingly, the dedicated bearer 465 is established and the VoLTE call may be performed.

It is again noted that although the signaling diagram 400 appears to show such that the dedicated bearer is triggered after the SIP: 183 session progress signaling, it is noted that this is not representative of the operations of the exemplary embodiments. In contrast, the SIP signaling including the invite, the 100 trying, and the 183 session progress may be performing in the order shown, but the triggering of the dedicated bearer may be performed in parallel to these SIP signaling and is not performed after the SIP signaling.

Figure 5:
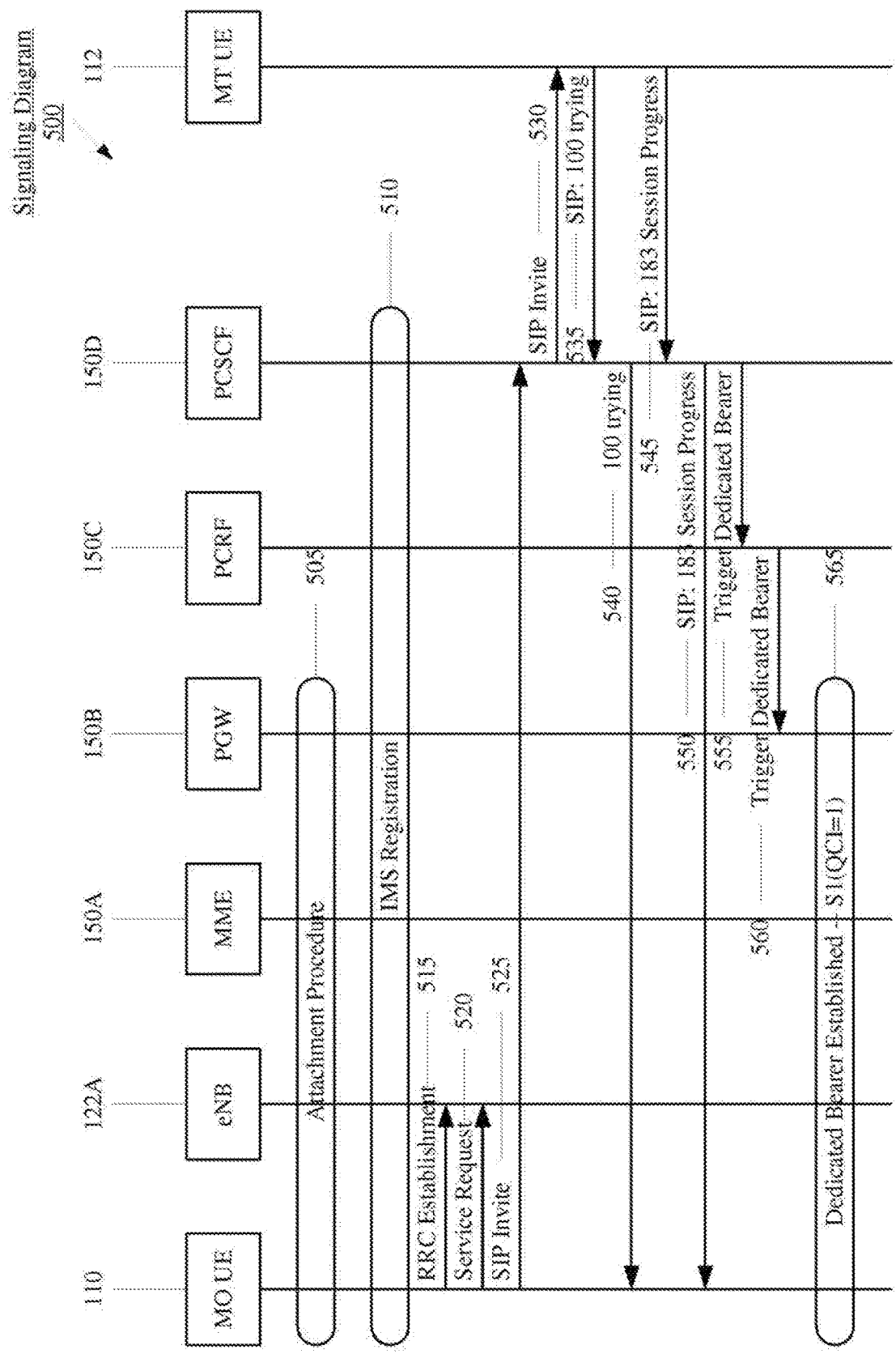
FIG. 5 shows a third exemplary signaling diagram for establishing a dedicated bearer through a user equipment operation, according to some embodiments.

FIG. 5 shows a third exemplary signaling diagram 500 for establishing a dedicated bearer through a UE operation, according to some embodiments. The signaling diagram 500 relates to when the UE 110 executes the VoLTE call application 235 and the dedicated bearer application 240 in performing the VoLTE call setup procedure. That is, the signaling diagram 500 further relates to the first set of mechanisms by which the MO UE 110 performs an operation to trigger the dedicated bearer in being established for the VoLTE call. The signaling diagram 500 relates to the operation performed on the UE 110 such that the dedicated bearer is established in such a way that the delay caused from the signaling between the P-CSCF 150D and the PCRF 150C after the SIP signaling is reduced and/or eliminated. It may be assumed that the other MT UE 112 is also capable of performing the VoLTE call and properly performs all necessary operations in establishing the VoLTE call.

The signaling diagram 500 illustrates a VoLTE call setup procedure. The signaling diagram 500 includes substantially similar operations as described above, particularly with regard to the signaling diagram 300 of FIG. 3. Thus, the MO UE 110 may perform an attachment procedure 505 and an IMS registration 510. With the UE 110 connected to the LTE-RAN 122 and the IMS 150 and the IMS registration procedure completed to indicate that the UE 110 is configured to perform the VoLTE call functionality, the UE 110 may execute the VoLTE call application 235. The initiation of the VoLTE call application 235 may again be used to initiate the operations performed by the dedicated bearer application 240.

Specifically, according to the third exemplary mechanism, the RRC establishment 515 and the SR 520 may be performed. The RRC establishment 515 may relate to a conventional procedure. Therefore, conventional operations may be performed in establishing the RRC to perform the VoLTE call such as when the MO UE 110 is in a RRC idle state. It is again noted that if the MO UE 110 is already in the RRC connected state, the RRC establishment 515 may not be performed. The SR 520 may be a follow-up procedure upon completing the RRC establishment 515 or a parallel procedure along with the RRC establishment 515. Although the conventional operations of the SR may also be performed, the exemplary embodiments include further information in the SR 520. Thus, the SR 520 may provide the basis upon which the dedicated bearer establishment is triggered while the remaining operations of the VoLTE call setup procedure are performed. In this manner, the VoLTE call setup procedure is no longer required to wait until after the SIP 183 signaling to be completed in triggering the dedicated bearer.

In a particular exemplary embodiment, the SR 520 may include a new security header type if the SR 520 is triggered by a voice call such as the VoLTE call. Thus, if the SR 520 is due to a voice call, the NAS may use a special security header type to indicate to the LTE-RAN 122 to reserve the QCI1 resource and trigger the dedicated bearer establishment after the SR 520 is completed. Again, referring to the 3GPP TS 24.301 and particularly to Table 9.3.1, the security header type (octet 1) includes a set of variables that are not used in the defined version of the protocol. Accordingly, the values may be adapted for use in the third mechanism of the exemplary embodiments.

After the SR 520 has been completed, the remaining operations of the VoLTE call setup procedure may be performed in addition to the parallel execution of the triggering of the dedicated bearer. Thus, the SIP signaling may be performed in which the SIP invite 425 may be transmitted from the MO UE 110 to the P-CSCF 150D; the SIP invite 430 may be transmitted from the P-CSCF to the MT UE 112; the SIP: 100 trying 435 may be transmitted from the MT UE 112 to the P-CSCF 150D, the 100 trying signal 335 may be transmitted from the P-CSCF 150D to the MO UE 110; the SIP: 183 session progress 445 may be transmitted from the MT UE 112 to the P-CSCF 150D; and the SIP: 183 session progress 450 may be transmitted from the P-CSCF 150D to the MO UE 110. While this SIP signaling is being performed, the signal to trigger the dedicated bearer 455 may be transmitted from the P-CSCF 150D to the PCRF 150C; and the signal to trigger the dedicated bearer 460 may be transmitted from the PCF 150C to the PGW 150B. Accordingly, the dedicated bearer 465 is established and the VoLTE call may be performed.

It is again noted that although the signaling diagram 400 appears to show such that the dedicated bearer is triggered after the SIP: 183 session progress signaling, it is noted that this is not representative of the operations of the exemplary embodiments. In contrast, the SIP signaling including the invite, the 100 trying, and the 183 session progress may be performing in the order shown, but the triggering of the dedicated bearer may be performed in parallel to these SIP signaling and is not performed after the SIP signaling.

It is also again noted that the use of the VoLTE call is only exemplary and that the VoLTE may be a component of a video call. Accordingly, the description above may also be applied to the video call. Those skilled in the art will understand that the use of the video call may include further aspects. The exemplary embodiments may be modified to accommodate these further aspects in performing the video call, particularly over the LTE-RAN 122 and/or the IMS 150. For example, when using the video call, the operations of the exemplary embodiments may further require the QCI2 (for the video) in addition to the QCI1 (for the voice). In another example, when using the video call, the exemplary embodiments may utilize a first security header in the third mechanism for the VoLTE call and a second security header for the video call.

Figure 6:
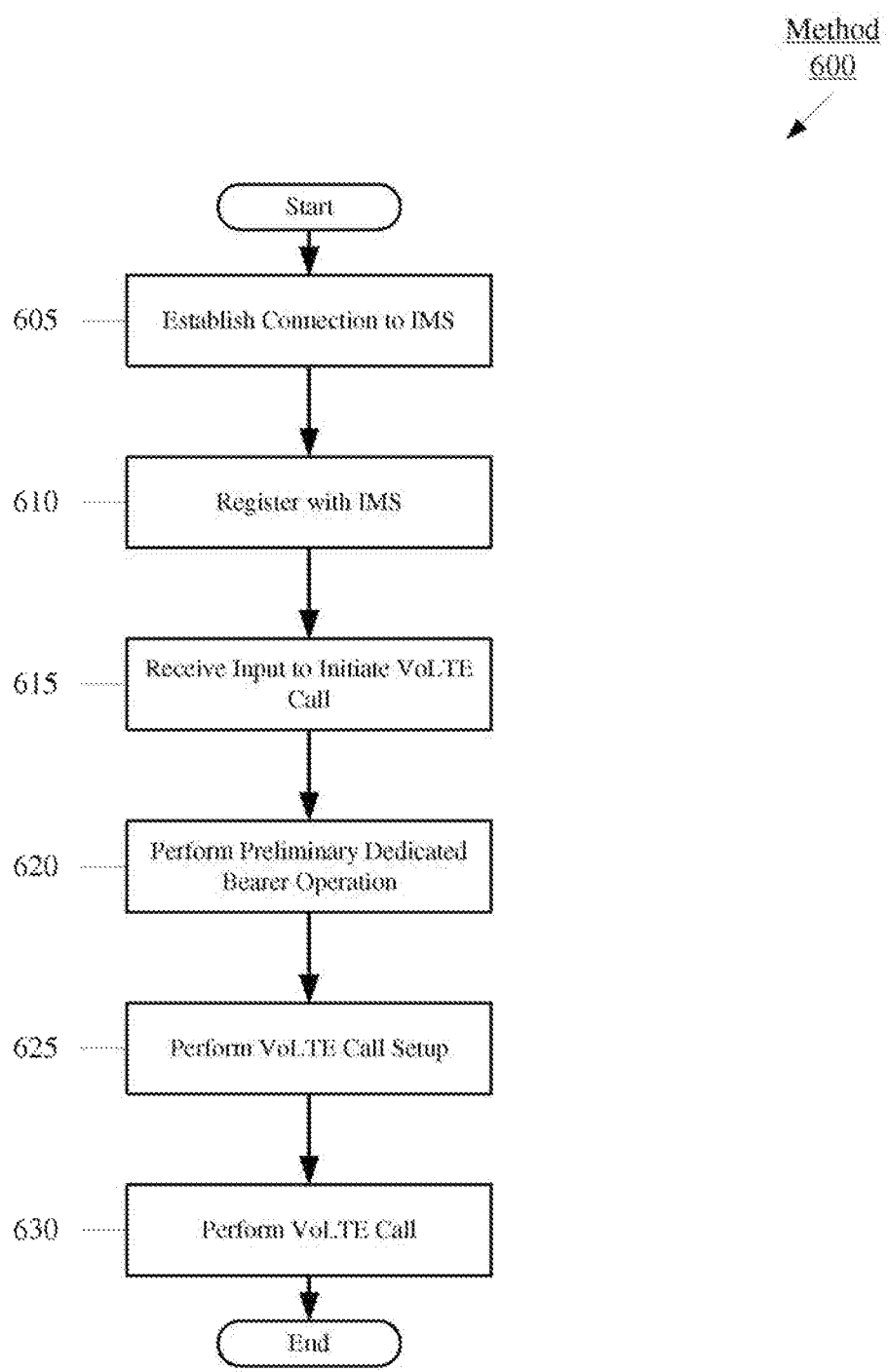
FIG. 6 shows an exemplary method for establishing a dedicated bearer through a user equipment operation, according to some embodiments.

FIG. 6 shows an exemplary method 600 for establishing a dedicated bearer through a UE operation, according to some embodiments. Specifically, the method 600 relates to when the UE 110 executes the dedicated bearer application 240 when the UE 110 is the MO in performing the VoLTE call. Thus, the method 600 relates to the first set of mechanisms in which the MO UE 110 performs an operation to trigger the dedicated bearer establishment. Again, it may be assumed that the UE 112, which is the other party to the VoLTE call, has performed all necessary operations to also participate in the VoLTE call. The method 600 will be described with regard to the UE 110. The method 600 will be described with reference to the network arrangement 100 of FIG. 1, the UE 200 of FIG. 2, and the signaling diagrams 300, 400, 500 of FIGS. 3, 4, 5, respectively.

In step 605, the UE 110 establishes a connection to the IMS 150. As discussed above, the UE 110 may initially establish a connection to the LTE-RAN 122 via the eNB 122A. Through the various interconnections between the networks, the UE 110 may also connect to the IMS 150 via the LTE-RAN 122 and the cellular core network 130. Various further operations associated with connecting to the different networks and IMS 150 may be performed such as establishing a default bearer for the UE 110. In step 610, the UE 110 may register with the IMS 150. That is, once connected thereto, the registration process may be performed to, among other reasons, determine the multimedia services to be provided or are capable by the UE 110 such as the VoLTE call.

In step 615, the UE 110 receives an input to initiate a VoLTE call. As discussed above, the UE 110 may include a VoLTE call application 235. The user may launch the VoLTE call application 235. The user may also select an identity of the MT UE 112 to perform the VoLTE call. These may be indications or inputs that initiate the VoLTE call.

In step 620, the UE 110 may execute the dedicated bearer application 240. The dedicated bearer application 240 may perform an operation to trigger the dedicated bearer in being established for the VoLTE call. As discussed above, the operations may relate to the first set of mechanisms in which the operation relates to a process prior to a SIP signal exchange for the VoLTE call. In the first mechanism, the RRC establishment 315 may include a VoLTE cause identification that notifies the eNB 122A to trigger the dedicated bearer establishment. In the second mechanism, the UL information transfer 420 may include a NAS update by using a dedicated bearer resource allocation request from the UE 110. In the third mechanism, the SR 520 may include a NAS update with a new cause identification using a security header type. Accordingly, the first set of mechanisms relate to generating and transmitting a modified data packet to indicate to the LTE-RAN 122 and/or the IMS 150 to trigger the procedure in establishing the dedicated bearer.

In step 625, the VoLTE call setup procedure may be performed. Specifically, the setup procedure may relate to a remainder of the processes including the SIP signaling exchange between the MO UE 110 and the MT UE 112 (e.g., via the P-CSCF 150D). Thus, the SIP invite, the SIP 100 trying, and the SIP 183 session progress may be exchanged in establishing the VoLTE call. Furthermore, while the SIP signaling exchange is being performed, the dedicated bearer may be established concurrently from the preliminary dedicated bearer operation being performed in step 620. That is, this aspect of the VoLTE call setup procedure of establishing the dedicated bearer may be triggered to be performed at the same time that the SIP signals are being exchanged. Subsequently, in step 630, the VoLTE call may be performed.

Figure 7:
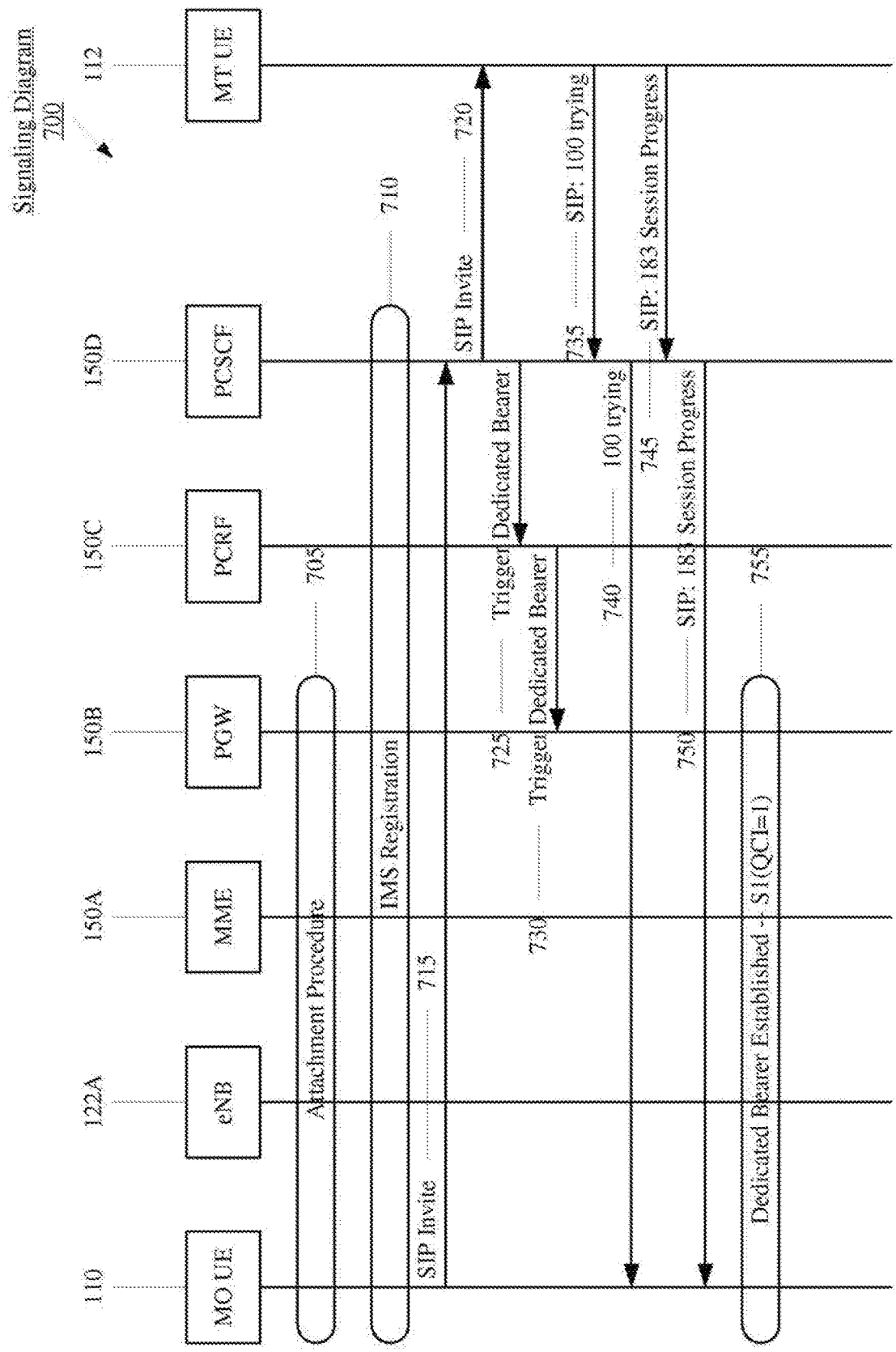
FIG. 7 shows an exemplary signaling diagram for establishing a dedicated bearer through a network operation, according to some embodiments.

FIG. 7 shows an exemplary signaling diagram 700 for establishing a dedicated bearer through a network operation, according to some embodiments. The signaling diagram 700 relates to when the IMS 150 performs the VoLTE call setup procedure in a way that the dedicated bearer is established upon receiving an indication that its use may be required. That is, the signaling diagram 700 relates to the second mechanism by which the IMS 150 utilizes a different policy and charging control procedure to trigger the dedicated bearer in being established for the VoLTE call. The signaling diagram 700 relates to the operation performed on the IMS 150 such that the dedicated bearer is established in such a way that the delay caused from the signaling between the P-CSCF 150D and the PCRF 150C after the SIP signaling is reduced and/or eliminated.

The signaling diagram 700 illustrates a VoLTE call setup procedure. The signaling diagram 700 includes substantially similar operations as described above, particularly with regard to the signaling diagram 300 of FIG. 3. Thus, the MO UE 110 may perform an attachment procedure 705 and an IMS registration 710. The UE 110 may also initiate a VoLTE call. However, since the signaling diagram 700 relates to a network operation, the IMS 150 may determine the VoLTE call initiation upon receiving the SIP invite 715 by the P-CSCF 150D.

Once the P-CSCF 150D has received the SIP invite 715 from the MO UE 110, the IMS 150 may perform subsequent operations. A conventional operation may be to forward the SIP invite 720 from the P-CSCF 150D to the MT UE 112. According to the exemplary embodiments, P-CSCF 150D further triggers the dedicated bearer operation. That is, the P-CSCF 150D may trigger the dedicated bearer 725 for the VoLTE call immediately upon receiving the SIP invite 715. The P-CSCF 150D may also mark the triggering of the dedicated bearer as a high policy and charging control to the PCRF 150C. This may ensure that the PGW 150B triggers the dedicated bearer 730 immediately when the PCRF normally may not send for the dedicated bearer until after the SIP signal exchange has completed (or after the SIP: 183 session progress has been exchanged).

The remainder of the signaling diagram 700 may be to the other operations in establishing the VoLTE call in addition to the parallel execution of the triggering of the dedicated bearer. Thus, the SIP: 100 trying 735 may be transmitted from the MT UE 112 to the P-CSCF 150D; the 100 trying signal 740 may be transmitted from the P-CSCF 150D to the MO UE 110; the SIP: 183 session progress 745 may be transmitted from the MT UE 112 to the P-CSCF 150D; and the SIP: 183 session progress 750 may be transmitted from the P-CSCF 150D to the MO UE 110. Accordingly, the dedicated bearer 755 is established and the VoLTE call may be performed. In this manner, the VoLTE call setup procedure is no longer required to wait until after the SIP 183 signaling to be completed in triggering the dedicated bearer.

It is again noted that although the signaling diagram 700 appears to show such that the dedicated bearer is triggered prior to any of the SIP signaling, it is noted that this is not representative of the operations of the exemplary embodiments. In contrast, the SIP signaling including the invite, the 100 trying, and the 183 session progress may be performed in the order shown, but the triggering of the dedicated bearer may be performed in parallel to these SIP signaling and is not performed after the SIP signaling.

Figure 8:
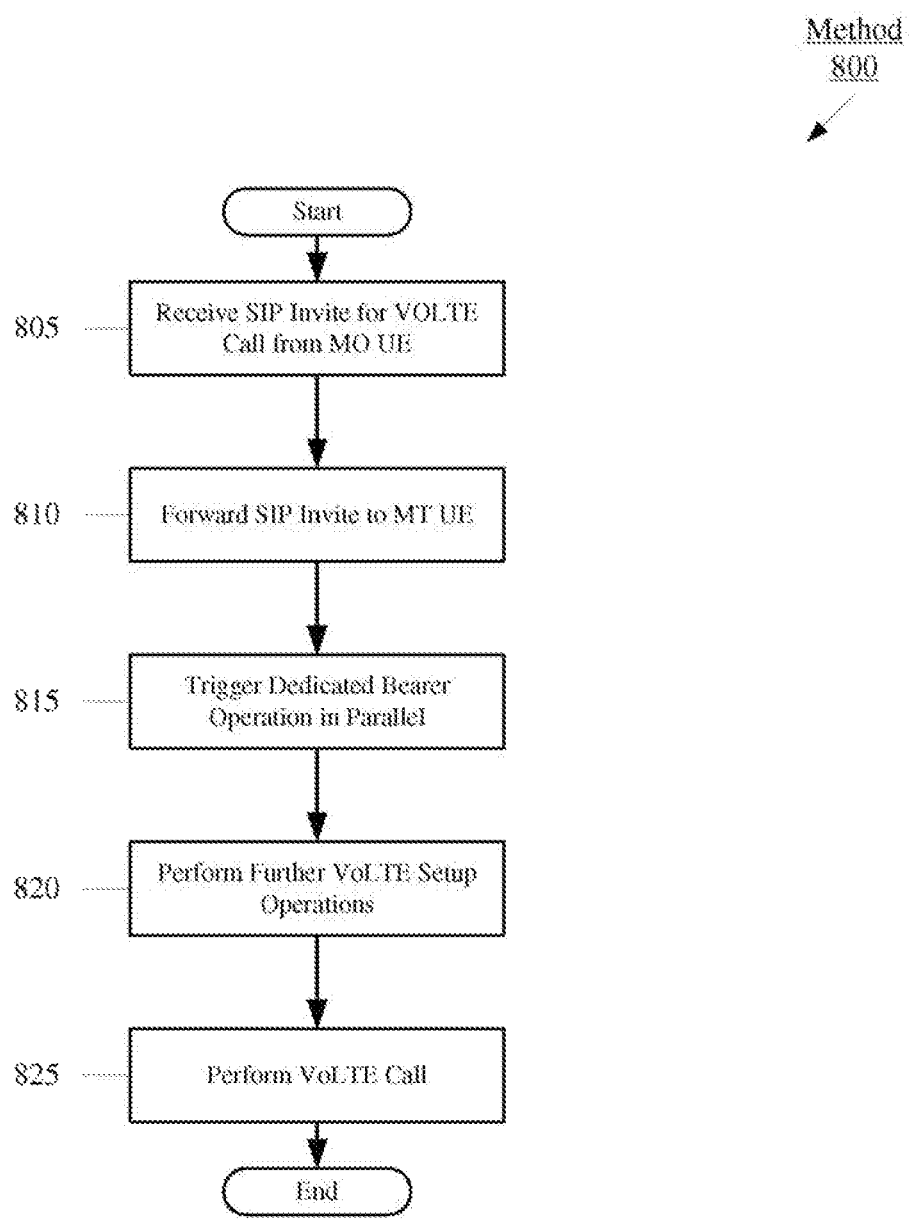
FIG. 8 shows an exemplary method for establishing a dedicated bearer through a network operation, according to some embodiments.

FIG. 8 shows an exemplary method 800 for establishing a dedicated bearer through a network operation, according to some embodiments. Specifically, the method 800 relates to when the IMS 150 performs an operation to trigger the dedicated bearer establishment. Thus, the method 800 relates to the second mechanism in which the P-CSCF 150D performs the operation to trigger the dedicated bearer establishment. Again, it may be assumed that the UEs 110, 112 have performed all necessary operations to participate in the VoLTE call. The method 800 will be described with regard to the IMS 150. The method 800 will be described with reference to the network arrangement 100 of FIG. 1, the UE 200 of FIG. 2, and the signaling diagram 700 of FIG. 7.

In step 805, the IMS 150 receives a SIP invite for the VoLTE call from the MO UE 110. Specifically, the SIP invite 715 may be received by the P-CSCF 150D. In steps 810 and 815, the IMS 150 may perform a conventional operation and an operation according to the exemplary embodiments, respectively. Specifically, in step 810, the IMS 150 may forward the SIP invite 720 from the P-CSCF 150D to the MT UE 112. In step 815, the IMS 150 may trigger the dedicated bearer operation in parallel. That is, upon receiving the SIP invite 715 by the P-CSCF 150D from the MO UE 110, the IMS 150 may simultaneously perform these operations. In step 820, the IMS 150 may perform the further and remaining VoLTE setup procedure operations. Specifically, the remaining SIP signaling exchanges (e.g., SIP 100 and SIP 183) may be performed. Concurrently, the IMS 150 may continue to establish the dedicated bearer for use in the VoLTE call. Thus, in step 825, the VoLTE call may be performed.

The exemplary embodiments provide a device, system, and method of enhancing a VoLTE call setup procedure. Specifically, the VoLTE call setup procedure may be enhanced by reducing and/or eliminating delays through a modified timing of triggering an establishment for a dedicated bearer to be used in the VoLTE call. Specifically, the procedure in establishing the dedicated bearer may be performed while the SIP signaling exchange for the VoLTE call setup procedure is also being performed, concurrently. In a first set of mechanisms, the enhancement may be performed through an operation of the UE. In a second mechanism, the enhancement may be performed through an operation of the IMS.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A user equipment, comprising:
a transceiver configured to establish a connection with a Long Term Evolution (LTE) Network and an Internet Protocol (IP) Multimedia Subsystem (IMS); and
a processor configured to execute a Voice over LTE (VoLTE) call application with a further user equipment, the processor configured to receive an input to execute the VoLTE call application, the processor configured to generate a data packet including an indication to trigger a dedicated bearer establishment procedure,
wherein the transceiver is configured to transmit the data packet to one of the LTE network and the IMS,
wherein the indication triggers the dedicated bearer establishment procedure to be performed during a Session Initiation Protocol (SIP) signal exchange procedure.

2. The user equipment of claim 1, wherein the transceiver initially connects to the LTE network, subsequently connects to the IMS, and registers with the IMS.

3. The user equipment of claim 1, wherein the packet data is included in a radio resource control (RRC) procedure with the LTE network.

4. The user equipment of claim 3, wherein the packet data includes a special cause identification to indicate to the LTE network to reserve a Quality of Service (QOS) Class Identifier (QCI) 1 resource.

5. The user equipment of claim 1, wherein the data packet is included in an uplink (UL) information transfer with a mobility management entity (MME) of the IMS.

6. The user equipment of claim 5, wherein the UL information transfer triggers a QCI1 establishment procedure at a Packet Data Network (PDN) Gateway (PGW) of the IMS.

7. The user equipment of claim 1, wherein the packet data is included in a service request (SR) with the LTE network.

8. The user equipment of claim 1, wherein the packet data includes a security header to reserve a QCI1 resource.

9. A method comprising:
at a user equipment (UE) configured to perform a Voice over Long Term Evolution (LTE) (VoLTE) call with a further UE, the UE connected to a LTE network and an Internet Protocol (IP) Multimedia Subsystem (IMS):
receiving an input to execute a VoLTE call application;
generating a data packet including an indication to trigger a dedicated bearer establishment procedure; and
transmitting the data packet to one of the LTE network and the IMS,
wherein the indication triggers the dedicated bearer establishment procedure to be performed during Session Indication Protocol (SIP) signal exchange procedure.

10. The method of claim 9, further comprising:
initially connecting to the LTE network;
connecting to the IMS; and
registering with the IMS.

11. The method of claim 9, wherein the data packet is included in a radio resource control (RRC) procedure with the LTE network.

12. The method of claim 11, wherein the data packet includes a special cause identification to indicate to the LTE network to reserve a Quality of Service (QOS) Class Identifier (QCI) 1 resource.

13. The method of claim 9, wherein the data packet is included in an uplink (UL) information transfer with a mobility management entity (MME) of the IMS.

14. The method of claim 13, wherein the UL information transfer triggers a QCI1 establishment procedure at a Packet Data Network (PDN) Gateway (PGW) of the IMS.

15. The method of claim 9, wherein the data packet is included in service request (SR) with the LTE network.

16. The method of claim 15, wherein the data packet is includes a security header to reserve a QCI1 resource.

17. A network component of an Internet Protocol (IP) Multimedia Subsystem (IMS), the network component comprising:
a transceiver configured to establish a connection with a Long Term Evolution (LTE) Network and first and second user equipments configured to perform a Voice over LTE (VoLTE) call; and
a processor configured to receive a Session Initiation Protocol (SIP) invite from the first user equipment to perform the VoLTE call with the second user equipment, the processor configured to generate a data packet to trigger a dedicated bearer establishment procedure, the processor configured to perform a forwarding operation to transmit the SIP invite to the second user equipment and to transmit the data packet to a gateway of the IMS,
wherein the data packet enables the dedicated bearer to be established during further SIP signal exchanges.

18. The network component of claim 17, wherein the network component is a proxy-call session control function (P-CSCF) component.

19. A method, comprising:
at a network component of an Internet Protocol (IP) Multimedia Subsystem (IMS),
establishing a connection with a Long Term Evolution (LTE) Network and first and second user equipments configured to perform a Voice over LTE (VoLTE) call;
receiving a Session Initiation Protocol (SIP) invite from the first user equipment to perform the VoLTE call with the second user equipment;
generating a data packet to trigger a dedicated bearer establishment procedure; and
performing a forwarding operation to transmit the SIP invite to the second user equipment and to transmit the data packet to a gateway of the IMS,
wherein the data packet enables the dedicated bearer to be established during further SIP signal exchanges.

20. The method of claim 19, wherein the network component is a proxy-call session control function (P-CSCF) component.

* * * * *

UNITED STATES PATENT AND TRADEMARK OFFICE
CERTIFICATE OF CORRECTION

PATENT NO. : 10,966,260 B2  
APPLICATION NO. : 15/755360  
DATED : March 30, 2021  
INVENTOR(S) : Liang et al.

Page 1 of 1

It is certified that error appears in the above-identified patent and that said Letters Patent is hereby corrected as shown below:

In the Claims

Claim 16, Column 18, Lines 14:
"The method of claim 15, wherein the data packet is" should read "The method of claim 15, wherein the data packet"

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*